United States Patent [19]

Reynolds

[11] Patent Number: 4,569,278
[45] Date of Patent: Feb. 11, 1986

[54] COOKING IMPLEMENT

[76] Inventor: Darcie F. Reynolds, 5 Duke St., Forestville, New South Wales 2087, Australia

[21] Appl. No.: 677,836

[22] Filed: Dec. 4, 1984

[30] Foreign Application Priority Data

Dec. 8, 1983 [AU] Australia .............................. PG2759

[51] Int. Cl.$^4$ ............................................. A47J 37/04
[52] U.S. Cl. ........................................ 99/394; 99/397
[58] Field of Search ................. 99/385, 394, 397, 426, 99/449; 294/8

[56] References Cited

U.S. PATENT DOCUMENTS

| 347,306 | 8/1886 | Stambaugh | 99/394 |
| 590,478 | 9/1897 | Elliott | 99/397 X |
| 903,852 | 11/1908 | Frith | 99/394 |
| 2,491,594 | 12/1949 | Williams | 99/394 |

FOREIGN PATENT DOCUMENTS

| 320804 | 10/1929 | United Kingdom | 99/394 |
| 395691 | 7/1933 | United Kingdom | 99/394 |
| 437281 | 10/1935 | United Kingdom | 99/394 |
| 596505 | 1/1948 | United Kingdom | 99/394 |
| 668361 | 3/1952 | United Kingdom | 99/394 |

Primary Examiner—Billy J. Wilhite
Attorney, Agent, or Firm—Hayes, Davis & Soloway

[57] ABSTRACT

A cooking implement for toasting and similar purposes has an elongated handle and a pivotally mounted food holding member which comprises a pair of legs extending from a pivotal mounting to respective foot portions from which respective arms extend to lie adjacent the respective portions of the legs whereby food can be held between the respective arms and legs and the foot portions are such that the legs are resiliently displaceable in a transverse direction extending from one leg towards the other and the respective arms and legs are resiliently displaceable away from each other; the foot portions are sufficiently spaced in the transverse direction to provide stable support for the food holding member when it rests on a supporting surface. The food holding member can be made from a single thin rod, for example of stainless steel with the foot portions formed from respective curved loops of relatively large radius of curvature.

10 Claims, 5 Drawing Figures

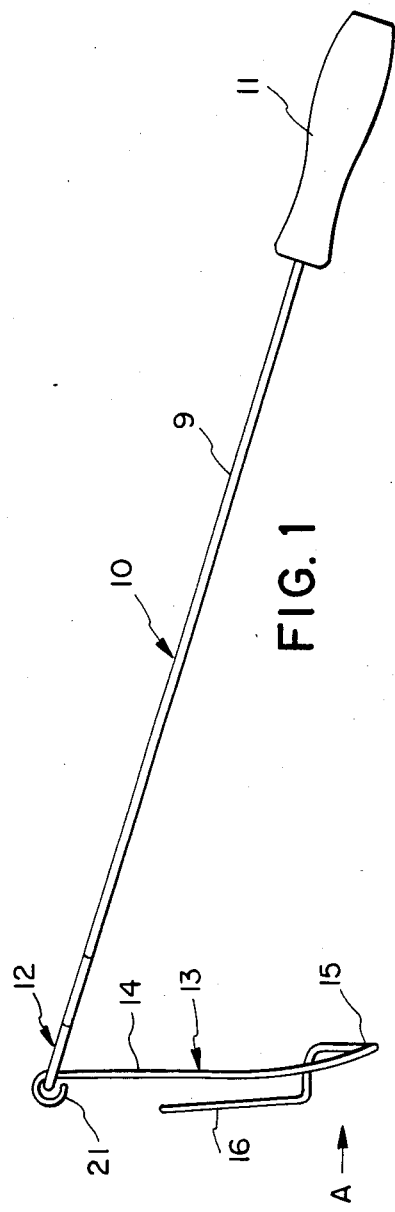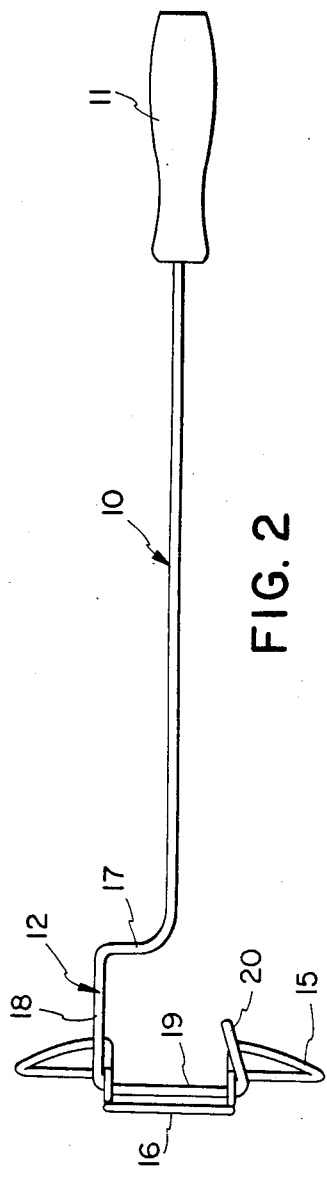

COOKING IMPLEMENT

FIELD OF THE INVENTION

The present invention relates to a cooking implement and one particular use of the implement can be for grilling or toasting food on an open fire.

BACKGROUND OF THE INVENTION

It is known to use simple rigid toasting forks or similar devices for holding crumpets, bread and the like in front of an open fire. It is also known to use a cooking implement in the form of bent wire device which can hold an item of food to be grilled. However, these implements have limitations with regard to the security with which the food is held and limitations in terms of the disposition that the food can be given to permit it to be grilled or cooked. It would be desirable to have an implement which is versatile, as well as being easy and reliable to use in a safe manner.

SUMMARY OF THE INVENTION

According to the present invention, there is provided a cooking implement comprising an elongated handle member and a food holding member having pivotal mounting means for mounting on an end portion of the elongated handle member, the food holding member further comprising legs extending from said pivotal mounting means to respective foot portions from which respective arms extend to lie adjacent respective portions of said legs, whereby food may be held between said legs and arms, and said foot portions are dimensioned such that, and the material from which said food holding member is made is selected such that the legs are resiliently displaceable in a transverse direction extending from one leg towards the other and said respective legs and arms are resiliently displaceable away from each other, and said foot portions are spaced in said transverse direction to provide stable support for said food holding member on a supporting surface.

The invention may be implemented with various further novel and inventive features described hereinafter.

Preferably the food holding member is formed from a single thin rod of metal bent to form the component portions; for example stainless steel rod can be particularly suitable.

Preferably each foot portion comprise a smoothly curved loop of at least 1½ centimeters radius approximately whereby the required resilience in the structure is provided and maintained.

Preferably the legs are arranged substantially in the same plane with the foot portions each formed by a loop in the metal rod, each loop being directed and extending to one side of said plane and leading to a terminal portion of the loop which extends substantially at right angles to said plane and passes through the plane to join with the respective arm which is disposed on the opposite side of the plane to said loop, each arm being spaced closely adjacent the respective leg.

Preferably the food holding member is formed such that before interconnection of the food holding member with the handle member, said legs extend along respective straight lines which slightly diverge, and upon pivotal engagement with the handle member the legs are adapted to be displaced resiliently so that the legs become substantially parallel. Preferably the degree of divergence is about twenty degrees.

With advantage the elongated handle member and the food holding member having corresponding spring inter-engagement means adapted to hold the food holding member to lie adjacent and extend along the longitudinal direction of the handle member, the spring means acting as a spring latch to retain the food holding member when it is pivotally moved into position adjacent the handle member. This feature is preferably implemented by providing the handle member with a laterally extending bar portion having first and second end portions extending transversely thereto and over which the ends of the legs of the food holding member are adapted to be pivotally engaged, one end portion being adapted to be an engagement element for engaging with an intermediate portion of one of said legs.

In a preferred embodiment, said one end portion comprises a substantially rigid engagement member behind which the associated leg can snap-fit by displacement of the leg towards the other leg against its inherent resilient biassing.

Another advantageous feature that may be provided in the handle member is a second bar portion included in the other of the end portions so that the pivotal mounting can be about either the first bar portion or the second bar portion, the axes of which are substantially at right angles. This can make the tool far more versatile.

BRIEF DESCRIPTION OF THE DRAWINGS

An embodiment of the invention will now be described by way of example with reference to the accompanying drawings, of which:

FIG. 1 is a side elevation of an assembled toasting tool embodying the invention and arranged for use in a first or normal configuration;

FIG. 2 is a plan view of the tool of FIG. 1;

DETAILED DESCRIPTION OF THE DRAWINGS

Figure 3:
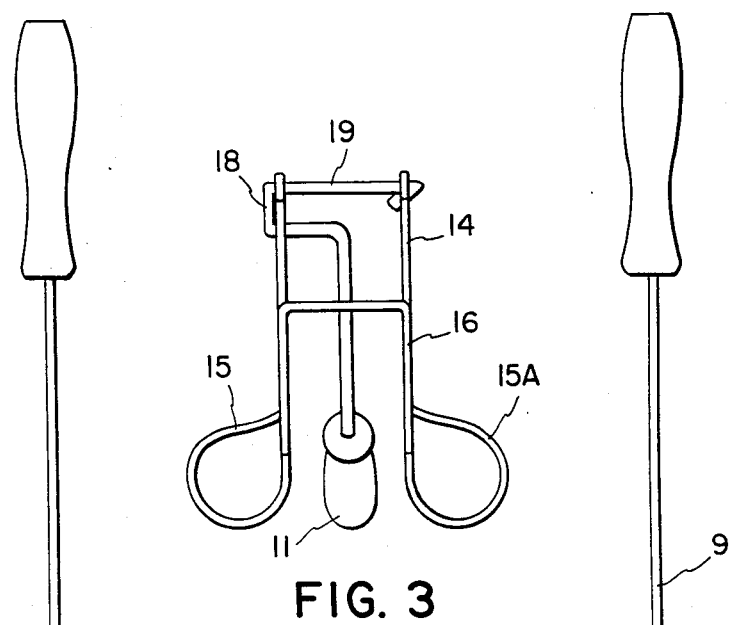
FIG. 3 is an end view of the tool of FIG. 1 taken in the direction of arrow A.

The toasting tool shown in the drawings comprises:

(a) a handle member 10 having a hand grip 11 and connection head 12, and (b) a displaceable food holder 13 having a pair of legs 14, feet 15 and interconnected arms 16 integrally formed from bent rod.

In a preferred embodiment the hand grip 11 is of wood and the main shaft and head unit 12 is of stainless steel rod whereas the food holder 13 is formed by bending thinner stainless steel rod of about one eighth inch diameter and conveniently of grade 304.

As best seen from FIG. 2, the head unit 12 is of a cranked form and comprises a transverse mounting portion 17, a longitudinal bar portion 18 at right angles thereto, a transverse bar portion 19 and a rearwardly directed inclined end portion 20.

It will be noted that the food holder 13 is simply slipped over the tip of the end portion 20 with hook shaped tips 21 at the end of each leg portion encircling the transverse bar portion 19 and being located at the extreme ends of this bar portion; the end portion 20 and longitudinal bar portion 18 exert pressure on the legs 14 which are displaced from an original position to be moved inwardly against the inherent biasing forces in the food holder so that the legs are parallel to one another. In the original position the legs angle away from one another with an included angle of about twenty degrees.

Figure 4:
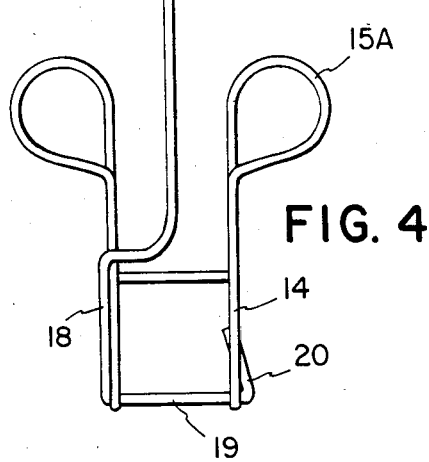
FIG. 4 is a plan view of the tool when in a second configuration with the food holder clipped against the shaft of the handle.
Figure 5:
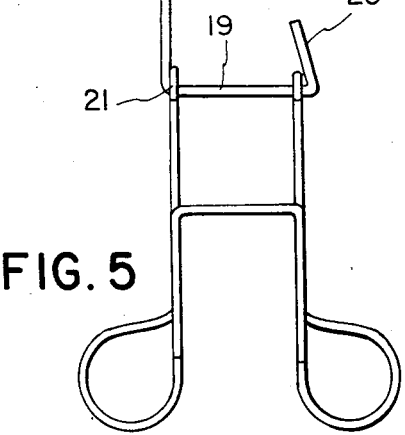
FIG. 5 is a further plan view showing the tool in another configuration with the food holder free to pivot.

It will be noted that pivotal motion of the food holder 13 (which can be achieved by gripping the wooden handle 11 and flipping the food holder in an anti-clockwise direction as seen in FIG. 1) causes an intermediate portion of one of the legs to snap-fit behind the end portion 20 to adopt the configuration shown in FIG. 4. This permits food to be grilled in an alternative configuration with the food holder generally extending in the same direction as the elongated handle.

The spring engagement can be readily released by exerting pressure on the foot portion 15A as shown in FIG. 4. The entire tool can be moved to cause the foot portion 15A (see FIG. 3) to be pressed against a solid object thereby displacing the associated leg to the left as shown in FIG. 4 whereby it can then be permitted to swing down under gravity and disengage from the end portion 20.

It will be noted that the bar portions 18 and 19 have the same length and thus the longitudinal bar portion 18 could also act in the same way as the transverse bar portion 19 as a pivot bar for suspending the food holder 13. This permits additional versatility in terms of the positioning of food relative to an open fire for toasting or grilling purposes.

I claim:

1. A cooking implement comprising an elongated handle member and a food holding member which comprises pivotal mounting means mounting the food holding member pivotally on an end portion of the elongated handle member, legs extending from said pivotal mounting means to respective foot portions, and respective arms extending from the foot portions and extending adjacent respective portions of said legs whereby food may be held between said legs and arms, said legs being resiliently displaceable relative to one another in a transverse direction extending from one leg towards the other, and each adjacent leg and arm being resiliently displaceable away from each other, and said foot portions being each shaped and dimensioned and spaced in said transverse direction from each other to provide stable support for said food holding member on a supporting surface.

2. A cooking implement as claimed in claim 1, and wherein the food holding member is formed from a single thin bent rod of resilient metal.

3. A cooking implement as claimed in claim 2 and, wherein the legs are arranged substantially in the same plane, the foot portions are each formed by a loop in the metal rod, each loop being directed and extending to one side of said plane and leading to a terminal portion of the loop which extends substantially at right angles to said plane and passes through the plane to join with the respective arm which is disposed on the opposite side of the plane to said loop, each arm being spaced closely adjacent the respective leg.

4. A cooking implement as claimed in claim 2, wherein said rod is of stainless steel.

5. A cooking implement as claimed in claim 2, and wherein by virtue of engagement with the handle member the legs are displaced resiliently against inherent biassing and are disposed substantially parallel to one another, said legs naturally extending along respective straight lines which slightly diverge.

6. A cooking implement as claimed in claim 1, wherein the foot portions comprise a smoothly curved loop of at least 1½ centimeters radius whereby resilience in the structure is provided and maintained.

7. A cooking implement as claimed in claim 1, wherein the elongated handle member and the food holding member have corresponding spring interengagement means adapted to hold the food holding member to lie adjacent and to extend along the longitudinal direction of the handle member, the spring interengagement means acting as a spring latch to retain the food holding member when it is pivotally moved into position adjacent the handle member.

8. A cooking implement as claimed in claim 7, wherein the handle member has a laterally extending bar portion and over which pivotal mounting loops at the ends of the legs pivotally engage, and end portions extending transversely from the bar portions for retaining said pivotal mounting loops, one of said end portions being adapted to be an engagement element of said interengagement means for engaging with an intermediate portion of one of said legs.

9. A cooking implement as claimed in claim 8, wherein said one end portion comprises a substantially rigid engagement member behind which said intermediate portion of said leg snap-fits by displacement of the leg towards the other leg against its inherent resilient biassing.

10. A cooking implement as claimed in claim 8, wherein there is a second bar portion included in the other of the end portions providing an alternative mounting for the pivotal mounting loops and extending at right angles to the first bar portion.

* * * * *